(12) United States Patent
Karaki et al.

(10) Patent No.: US 11,711,846 B2
(45) Date of Patent: *Jul. 25, 2023

(54) MULTIPLE STARTING AND ENDING POSITIONS FOR SCHEDULED DOWNLINK TRANSMISSION ON UNLICENSED SPECTRUM

(71) Applicant: Telefonaktiebolaget LM Ericsson (publ), Stockholm (SE)

(72) Inventors: Reem Karaki, Aachen (DE); Yu Yang, Solna (SE); Havish Koorapaty, Saratoga, CA (US); Jung-Fu Cheng, Fremont, CA (US); Sorour Falahati, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/347,723

(22) Filed: Jun. 15, 2021

(65) Prior Publication Data
US 2021/0315008 A1 Oct. 7, 2021

Related U.S. Application Data

(63) Continuation of application No. 16/484,070, filed as application No. PCT/IB2018/052005 on Mar. 23, 2018, now Pat. No. 11,064,522.
(Continued)

(51) Int. Cl.
*H04W 74/08* (2009.01)
*H04L 5/00* (2006.01)
(Continued)

(52) U.S. Cl.
CPC ....... *H04W 74/0808* (2013.01); *H04L 1/0003* (2013.01); *H04L 5/0082* (2013.01);
(Continued)

(58) Field of Classification Search
CPC ......... H04W 74/0808; H04W 72/1205; H04W 72/1268; H04W 74/0816; H04W 16/14;
(Continued)

(56) References Cited

U.S. PATENT DOCUMENTS 7,091,830 B2 8/2006 Anderson et al.
7,562,390 B1 7/2009 Kwan
(Continued)

FOREIGN PATENT DOCUMENTS

CN 105309033 A 2/2016
CN 105636233 A 6/2016
(Continued)

OTHER PUBLICATIONS

Author Unknown, "Technical Specification Group Radio Access Network; Evolved Universal Terrestrial Radio Access (E-UTRA); Physical channels and modulation (Release 12)," Technical Specification 36.211, Version 12.3.0, 3GPP Organizational Partners, Sep. 2014, 124 pages.
(Continued)

*Primary Examiner* — Dady Chery
(74) *Attorney, Agent, or Firm* — Withrow & Terranova, PLLC

(57) ABSTRACT

Systems and methods are disclosed herein that relate to multiple candidate starting points for a transmit burst in unlicensed spectrum. In some embodiments, a method of operation of a radio access node for performing a transmit burst in an unlicensed spectrum comprises transmitting a transmit burst in an unlicensed spectrum, wherein the transmit burst spans multiple subframes/slots and the transmitting of the transmit burst starts at one of a plurality of candidate starting points defined in at least a first subframe/slot of the transmit burst that occurs after successful completion of a Listen-Before-Talk (LBT) procedure for the trans-
(Continued)

mit burst. In this manner, a radio access node (e.g., an enhanced or evolved Node B (eNB) in Long Term Evolution (LTE)) has flexibility to transmit a downlink transmit burst starting at different starting positions based on LBT outcome.

18 Claims, 11 Drawing Sheets

Related U.S. Application Data

(60) Provisional application No. 62/479,973, filed on Mar. 31, 2017, provisional application No. 62/476,491, filed on Mar. 24, 2017, provisional application No. 62/476,553, filed on Mar. 24, 2017.

(51) Int. Cl.
*H04W 16/14* (2009.01)
*H04W 72/0446* (2023.01)
*H04L 1/00* (2006.01)
*H04W 72/1268* (2023.01)
*H04W 72/12* (2023.01)
*H04W 76/27* (2018.01)

(52) U.S. Cl.
CPC ....... *H04W 16/14* (2013.01); *H04W 72/0446* (2013.01); *H04W 72/12* (2013.01); *H04W 72/1268* (2013.01); *H04W 74/0816* (2013.01); *H04W 76/27* (2018.02)

(58) Field of Classification Search
CPC .............. H04W 72/0446; H04W 76/27; H04L 1/0003; H04L 5/0082
See application file for complete search history.

(56) References Cited

U.S. PATENT DOCUMENTS

| | | |
|---|---|---|
| 7,920,544 B2 | 4/2011 | Soliman et al. |
| 10,349,401 B2 | 7/2019 | Cheng et al. |
| 10,630,518 B2 | 4/2020 | Park et al. |
| 10,742,562 B2 | 8/2020 | Si et al. |
| 10,805,953 B2 | 10/2020 | Babaei et al. |
| 11,032,839 B2 | 6/2021 | Ke et al. |
| 2004/0086053 A1 | 5/2004 | Anderson et al. |
| 2012/0014349 A1 | 1/2012 | Chung et al. |
| 2012/0213196 A1 | 8/2012 | Chung et al. |
| 2016/0135185 A1 | 5/2016 | Chandrasekhar et al. |
| 2016/0278048 A1 | 9/2016 | Nory et al. |
| 2016/0345345 A1 | 11/2016 | Malik et al. |
| 2016/0360525 A1 | 12/2016 | Cheng et al. |
| 2017/0019909 A1 | 1/2017 | Si et al. |
| 2017/0041805 A1 | 2/2017 | Chandrasekhar et al. |
| 2017/0042805 A1 | 2/2017 | Goldberg |
| 2017/0202022 A1 | 7/2017 | Chendamarai Kannan et al. |
| 2017/0231006 A1 | 8/2017 | Yin et al. |
| 2017/0290008 A1 | 10/2017 | Tooher et al. |
| 2017/0332358 A1 | 11/2017 | Park et al. |
| 2019/0007972 A1 | 1/2019 | Gou et al. |
| 2019/0150184 A1 | 5/2019 | Golitschek Edler von Elbwart et al. |
| 2019/0289635 A1* | 9/2019 | Wang ...................... H04L 5/001 |
| 2019/0379487 A1 | 12/2019 | Hwang et al. |
| 2019/0387543 A1 | 12/2019 | Karaki et al. |
| 2020/0053782 A1 | 2/2020 | Zhang et al. |
| 2020/0067651 A1 | 2/2020 | Takeda et al. |
| 2020/0100286 A1 | 3/2020 | Xu et al. |
| 2020/0127798 A1 | 4/2020 | Yang et al. |
| 2020/0187249 A1 | 6/2020 | Yang et al. |
| 2020/0205090 A1 | 6/2020 | Loehr et al. |
| 2020/0235898 A1 | 7/2020 | Loehr et al. |
| 2020/0266922 A1 | 8/2020 | Zhang et al. |
| 2020/0322990 A1 | 10/2020 | Liu et al. |
| 2020/0337083 A1 | 10/2020 | Loehr et al. |
| 2020/0344819 A1 | 10/2020 | Myung et al. |
| 2020/0404708 A1 | 12/2020 | Zhang et al. |
| 2021/0067308 A1 | 3/2021 | Ly et al. |
| 2021/0160919 A1 | 5/2021 | Wang et al. |

FOREIGN PATENT DOCUMENTS

| | | |
|---|---|---|
| EP | 3131223 A1 | 2/2017 |
| EP | 3131225 A1 | 2/2017 |
| RU | 2479138 C2 | 4/2013 |
| WO | 2015042594 A2 | 3/2015 |
| WO | 2016074250 A1 | 5/2016 |
| WO | 2016092492 A1 | 6/2016 |
| WO | 2016146210 A1 | 9/2016 |
| WO | 2016148634 A2 | 9/2016 |
| WO | 2017049560 A1 | 3/2017 |
| WO | 2017207043 A1 | 12/2017 |
| WO | 2018059412 A1 | 4/2018 |
| WO | 2018173005 A1 | 9/2018 |
| WO | 2018198092 A1 | 11/2018 |

OTHER PUBLICATIONS

3GPP TS 36.212, V12.6.0, 3rd Generation Partnership Project; Technical Specification Group Radio Access Network; Evolved Universal Terrestrial Radio Access (E-UTRA); Radio Resource Control (RRC), Release 12, Mar. 2015.

Author Unknown, "Technical Specification Group Radio Access Network; Evolved Universal Terrestrial Radio Access (E-UTRA); Multiplexing and channel coding (Release 12)," Technical Specification 36.212, Version 12.6.0, 3GPP Organizational Partners, Sep. 2015, 95 pages.

Author Unknown, "Technical Specification Group Radio Access Network; Evolved Universal Terrestrial Radio Access (E-UTRA); Physical layer procedures (Release 12)," Technical Specification 36.213, Version 12.3.0, 3GPP Organizational Partners, Sep. 2014, 212 pages.

Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.1.0, 3GPP Organizational Partners, Mar. 2014, 57 pages.

Cuevas, Roberto, et al., "Uplink Ultra-Reliable low latency communications assessment in unlicenced spectrum," Globecom Workshops, Feb. 2019, 6 pages.

Ericsson, et al., "R1-163508: MCS Table for Initial Partial TTI in LAA," Third Generation Partnership Project (3GPP), TSG-RAN WG1 #84bis, Apr. 11-15, 2016, 4 pages, Busan, Korea.

Ericsson, "A solution for RLF in CP NB-IoT", 3GPP TSG-SA WG2 Meeting #86, S3-170254, Feb. 6-10, 2017.

Huawei, et al., "R1-1700420: Discussion on usage of mini-slot in unlicensed band below 6GHz," Third Generation Partnership Project (3GPP), TSG RAN WG1 NR AdHoc Meeting, Jan. 16-20, 2017, 5 pages, Spokane, USA.

Huawei, "R4-1701085: Discussion on eLAA demodulation test," Third Generation Partnership Project (3GPP), TSG-RAN WG4 Meeting #82, Feb. 13-17, 2017, 5 pages, Athens, Greece.

Intel Corporation, "R1-1704682: On the multiple uplink starting and ending positions for FS3," Third Generation Partnership Project (3GPP), TSG RAN WG1 Meeting #88bis, Apr. 3-7, 2017, 6 pages, Spokane, USA.

Maldonado, Roberto, et al., "Latency and Reliability Analysis of Cellular Networks in Unlicensed Spectrum," IEEE Access, vol. 6, Mar. 3, 2020, 12 pages.

RAN1: "R2-1700692: Response LS to IEEE 802.11 regarding LAA," 3GPP TSG RAN WG2#97, Feb. 13-17, 2017, Athens, Greece, 13 pages.

Examination Report for European Patent Application No. 18717997. 3, dated Jun. 7, 2021, 11 pages.

Examination Report for European Patent Application No. 18717998. 1, dated Jun. 28, 2021, 12 pages.

(56) References Cited

OTHER PUBLICATIONS

International Search Report and Written Opinion for International Patent Application No. PCT/IB2018/052005, dated Jun. 19, 2018, 14 pages.
International Search Report and Written Opinion for International Patent Application No. PCT/IB2018/052949, dated Aug. 21, 2018, 17 pages.
Written Opinion for International Patent Application No. PCT/IB2018/052949, dated Mar. 25, 2019, 17 pages.
International Preliminary Report on Patentability for International Patent Application No. PCT/IB2018/052949, dated Jul. 10, 2019, 32 pages.
Non-Final Office Action for U.S. Appl. No. 16/484,070, dated Sep. 25, 2020, 11 pages.
International Search Report and Written Opinion for International Patent Application No. PCT/IB2018/052006, dated Jun. 22, 2018, 15 pages.
Non-Final Office Action for U.S. Appl. No. 16/608,950, dated Jan. 12, 2021, 16 pages.
Final Office Action for U.S. Appl. No. 16/608,950, dated Apr. 19, 2021, 29 pages.
Notice of Allowance and Examiner-Initiated Interview Summary for U.S. Appl. No. 16/608,950, dated Jul. 16, 2021, 10 pages.
Notice of Allowance for U.S. Appl. No. 16/474,072, dated Jul. 1, 2021, 11 pages.
Non-Final Office Action for U.S. Appl. No. 17/484,474, dated Sep. 15, 2022, 10 pages.
Intel Corporation, "R2-151102: Uplink transmission with LBT," 3GPP TSG-RAN WG2 #89bis, Apr. 20-24, 2015, Bratislava, Slovakia, 6 pages.
Samsung, "R1-160557: Discussion on multi-subframe scheduling for UL LAA," 3GPP TSG RAN WG1 Meeting #84, Feb. 15-19, 2016, St. Julian's, Malta, 2 pages.
First Office Action for Chinese Patent Application No. 2018800201613, dated Nov. 24, 2022, 12 pages.
First Office Action for Chinese Patent Application No. 2018800201806, dated Nov. 25, 2022, 11 pages.
Intention to Grant for European Patent Application No. 18717998.1, dated Jan. 19, 2023, 8 pages.
Final Office Action for U.S. Appl. No. 17/464,474, dated Jan. 17, 2023, 20 pages.
Notice of Allowance for U.S. Appl. No. 17/484,474, dated Mar. 20, 2023, 10 pages.

* cited by examiner

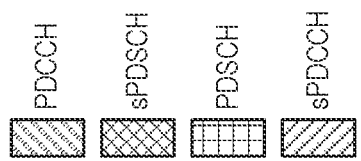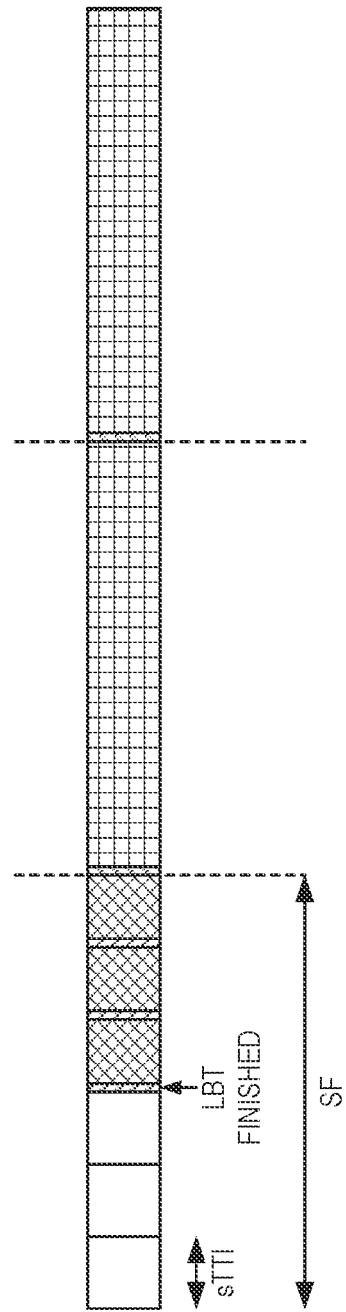
FIG. 8
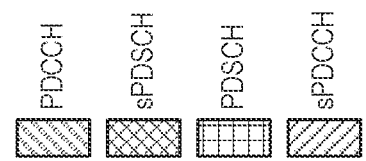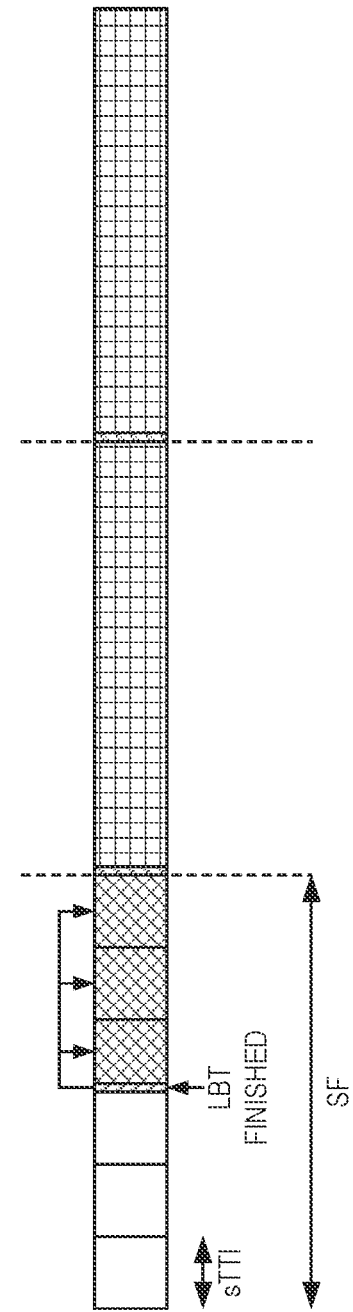
FIG. 9

MULTIPLE STARTING AND ENDING POSITIONS FOR SCHEDULED DOWNLINK TRANSMISSION ON UNLICENSED SPECTRUM

RELATED APPLICATIONS

This application is a continuation of U.S. patent application Ser. No. 16/484,070, filed Aug. 6, 2019, now U.S. Pat. No. 11,064,522 B2, which is a national stage application of International Patent Application No. PCT/IB2018/052005, filed Mar. 23, 2018, which claims the benefit of U.S. Provisional Patent Applications Nos. 62/476,491 and 62/476,553 filed on Mar. 24, 2017, and U.S. Provisional Patent Application No. 62/479,973 filed on Mar. 31, 2017, the respective disclosures of which are hereby incorporated by reference.

TECHNICAL FIELD

The disclosed subject matter relates generally to telecommunications and, in particular, to transmission in an unlicensed spectrum.

BACKGROUND

The Third Generation Partnership Project (3GPP) work on "License Assisted Access" (LAA) intends to allow Long Term Evolution (LTE) equipment to also operate in the unlicensed radio spectrum. Candidate bands for LTE operation in the unlicensed spectrum include 5 Gigahertz (GHz), 3.5 GHz, etc. The unlicensed spectrum is used as a complement to the licensed spectrum or allows completely standalone operation.

For the case of unlicensed spectrum used as a complement to the licensed spectrum, devices connect in the licensed spectrum to a Primary Cell (PCell) and use Carrier Aggregation (CA) to benefit from additional transmission capacity in the unlicensed spectrum, e.g., via a Secondary Cell (SCell) in the unlicensed spectrum. The CA framework allows aggregation of two or more carriers with the condition that at least one carrier, or frequency channel, is in the licensed spectrum and at least one carrier is in the unlicensed spectrum. In the standalone, or completely unlicensed spectrum, mode of operation, one or more carriers are selected solely in the unlicensed spectrum.

Regulatory requirements, however, may not permit transmissions in the unlicensed spectrum without prior channel sensing, transmission power limitations, or imposed maximum channel occupancy time. Since the unlicensed spectrum is generally shared with other radios of similar or dissimilar wireless technologies, a so called Listen-Before-Talk (LBT) method needs to be applied. LBT involves sensing the medium for a predefined minimum amount of time and backing off if the channel is busy. Due to the centralized coordination and dependency of terminal devices on the base station (enhanced or evolved Node B (eNB)) for channel access in LTE operation and imposed LBT regulations, LTE uplink (UL) performance is especially hampered. UL transmission is becoming more and more important with user-centric applications and the need for pushing data to the cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

LTE uses Orthogonal Frequency Division Multiplexing (OFDM) in the downlink (DL) and Discrete Fourier Transform (DFT)-spread OFDM, which is also referred to as single-carrier Frequency Division Multiple Access (FDMA), in the UL. The basic LTE downlink physical resource can thus be seen as a time-frequency grid as illustrated in FIG. 1 where each resource element corresponds to one OFDM subcarrier during one OFDM symbol interval. The UL subframe has the same subcarrier spacing as the DL and the same number of Single Carrier FDMA (SC-FDMA) symbols in the time domain as OFDM symbols in the DL.

In the time domain, LTE downlink transmissions are organized into radio frames of 10 milliseconds (ms), each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

DL transmissions are dynamically scheduled, i.e., in each subframe the base station transmits control information about which terminals data is transmitted to and upon which resource blocks the data is transmitted, in the current DL subframe. This control signaling is typically transmitted in the first 1, 2, 3, or 4 OFDM symbols in each subframe and the number n=1, 2, 3, or 4 is known as the Control Format Indicator (CFI). The DL subframe also contains common reference symbols, which are known to the receiver and used for coherent demodulation of, e.g., the control information. A DL system with CFI=3 OFDM symbols as control is illustrated in FIG. 3. The reference symbols shown in FIG. 3 are the Cell Specific Reference Symbols (CRSs) and are used to support multiple functions including fine time and frequency synchronization and channel estimation for certain transmission modes.

UL transmissions are dynamically scheduled, i.e., in each DL subframe the base station transmits control information about which terminals should transmit data to the eNB in subsequent subframes, and upon which resource blocks the data is transmitted. The UL resource grid is comprised of data and UL control information in the Physical Uplink Shared Channel (PUSCH), UL control information in the Physical Uplink Control Channel (PUCCH), and various reference signals such as Demodulation Reference Signals (DMRSs) and Sounding Reference Signals (SRSs). DMRSs are used for coherent demodulation of PUSCH and PUCCH data, whereas SRS is not associated with any data or control information but is generally used to estimate the UL channel quality for purposes of frequency-selective scheduling. An example UL subframe is shown in FIG. 4. Note that UL DMRS and SRS are time-multiplexed into the UL subframe, and SRSs are always transmitted in the last symbol of a normal UL subframe. The PUSCH DMRS is transmitted once every slot for subframes with normal cyclic prefix, and is located in the fourth and eleventh SC-FDMA symbols.

From LTE Release (Rel) 11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are User Equipment device (UE) specific and are indicated by scrambling the DL Control Information (DCI) Cyclic Redundancy Check (CRC) with the UE-specific Cell Radio Network Temporary Identifier (C-RNTI). A unique C-RNTI is assigned by a cell to every UE associated with it, and can take values in the range 0001-FFF3 in hexadecimal format. A UE uses the same C-RNTI on all serving cells.

In LTE the UL access is typically controlled by the eNB, i.e., scheduled. In this case the UE would report to the eNB when data is available to be transmitted, e.g., by sending a Scheduling Request (SR) message. Based on this, the eNB would grant the resources and relevant information to the UE in order to carry out the transmission of a certain size of data. The assigned resources are not necessarily sufficient for the UE to transmit all the available data. Therefore, it is possible that the UE sends a Buffer Status Report (BSR) control message in the granted resources in order to inform the eNB about the correct size and updated size of the data waiting for transmission. Based on that, the eNB would further grant the resources to carry on with the UE UL transmission of the corrected size of data.

In more detail, every time new data arrives at the UE's empty buffer, the following procedure should be performed:
  a. Using PUCCH, the UE informs the network that it needs to transmit data by sending a SR indicating that it needs UL access. The UE has aperiodic timeslots for SR transmissions, typically on a 5, 10, or 20 ms interval.
  b. Once the eNB receives the SR request bit, it responds with a small "uplink grant" that is just large enough to communicate the size of the pending buffer. The reaction to this request typically takes 3 ms.
  c. After the UE receives and processes (takes about 3 ms) its first UL grant, it typically sends a BSR that is a Medium Access Control (MAC) Control Element (CE) used to provide information about the amount of pending data in the UL buffer of the UE. If the grant is big enough, the UE sends data from its buffer within this transmission as well. Whether the BSR is sent depends also on conditions specified in 3GPP Technical Specification (TS) 36.321.
  d. The eNB receives the BSR message, allocates the necessary UL resources, and sends back another UL grant that will allow the device to drain its buffer.

Adding it all up, about 16 ms (plus time to wait for PUCCH transmission opportunity) of delay can be expected between data arrival at the empty buffer in the UE and reception of this data in the eNB.

In case the UE is not Radio Resource Control (RRC) connected in LTE or lost its UL synchronization since it did not transmit or receive anything for a certain time, the UE would use the random access procedure to connect to the network, obtain synchronization, and also send the SR. If this is the case, the procedure until the data can be sent would take even longer than the SR transmission on PUCCH.

In the LTE system, the transmission formats and parameters are controlled by the eNB. Such DCI typically contains:

resources allocated for UL transmission including whether frequency hopping is applied,
modulation and coding scheme,
redundancy versions,
new data indicator,
transmit power control command,
information about DMRS,
in case of cross-carrier scheduling, the target carrier index is also included, and
other applicable control information on UL transmissions.

The DCI is first protected by 16-bit CRC. The CRC bits are further scrambled by the UE assigned identity (C-RNTI). The DCI and scrambled CRC bits are further protected by convolutional coding. The encoded bits are transmitted from the eNB to the UE using either PDCCH or EPDCCH.

Special subframe is defined for frame structure 2 for LTE and the configuration is listed below.

TABLE 1

Configuration of special subframe (lengths of DwPTS/GP/UpPTS)

| Special on subframe configuration | DwPTS | UpPTS | |
|---|---|---|---|
| | | Normal cyclic prefix in uplink | Extended cyclic prefix in uplink |
| Normal cyclic prefix in downlink | | | |
| 0 | $6592 \cdot T_s$ | $(1 + X) \cdot 2192 \cdot T_s$ | $(1 + X) \cdot 2560 \cdot T_s$ |
| 1 | $19760 \cdot T_s$ | | |
| 2 | $21952 \cdot T_s$ | | |
| 3 | $24144 \cdot T_s$ | | |
| 4 | $26336 \cdot T_s$ | | |
| 5 | $6592 \cdot T_s$ | $(2 + X) \cdot 2192 \cdot T_s$ | $(2 + X) \cdot 2560 \cdot T_s$ |
| 6 | $19760 \cdot T_s$ | | |
| 7 | $21952 \cdot T_s$ | | |
| 8 | $24144 \cdot T_s$ | | |
| 9 | $13168 \cdot T_s$ | | |
| Extended cyclic prefix in downlink | | | |
| 0 | $7680 \cdot T_s$ | $(1 + X) \cdot 2192 \cdot T_s$ | $(1 + X) \cdot 2560 \cdot T_s$ |
| 1 | $20480 \cdot T_s$ | | |
| 2 | $23040 \cdot T_s$ | | |
| 3 | $25600 \cdot T_s$ | | |
| 4 | $7680 \cdot T_s$ | $(2 + X) \cdot 2192 \cdot T_s$ | $(2 + X) \cdot 2560 \cdot T_s$ |
| 5 | $20480 \cdot T_s$ | | |
| 6 | $23040 \cdot T_s$ | | |
| 7 | $12800 \cdot T_s$ | | |
| 8 | — | — | — |
| 9 | — | — | — |

Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 5, a UE is connected to a PCell in the licensed band and one or more SCells in the unlicensed band. In this document, a SCell in unlicensed spectrum is denoted as a LAA SCell. In the case of standalone operation as in MulteFire, no licensed cell is available for UL control signal transmissions.

SUMMARY

Systems and methods are disclosed herein that relate to multiple candidate starting points for a transmit burst in unlicensed spectrum. In some embodiments, a method of operation of a radio access node for performing a transmit burst in an unlicensed spectrum comprises transmitting a transmit burst in an unlicensed spectrum, wherein the transmit burst spans multiple subframes/slots and the transmitting of the transmit burst starts at one of a plurality of candidate starting points defined in at least a first subframe/slot of the transmit burst that occurs after successful completion of a Listen-Before-Talk (LBT) procedure for the transmit burst. In this manner, a radio access node (e.g., an enhanced or evolved Node B (eNB) in Long Term Evolution (LTE)) has flexibility to transmit a downlink transmit burst starting at different starting positions based on LBT outcome.

In some embodiments, the LBT procedure for the transmit burst successfully completes after a start of the first subframe/slot of the transmit burst such that the one of the plurality of candidate starting points at which the transmitting of the transmit burst begins occurs after the start of the first subframe/slot of the transmit burst.

In some embodiments, the plurality of candidate starting points comprises starting points of two or more short Transmit Time Intervals (sTTIs)/mini-slots in the at least the first subframe/slot of the transmit burst, and transmitting the transmit burst comprises transmitting the transmit burst in the unlicensed spectrum using sTTI/mini-slot scheduling in the at least the first subframe/slot of the transmit burst. In some embodiments, the LBT procedure for the transmit burst completes after a start of the first subframe/slot of the transmit burst, and the one of the plurality of candidate starting points at which the transmitting of the transmit burst begins is the starting point of one of the two or more sTTIs/mini-slots in the at least the first subframe/slot of the transmit burst that occurs after the successful completion of the LBT procedure for the transmit burst.

In some embodiments, the radio access node is configured to use sTTI/mini-slot scheduling in all subframe/slots of the transmit burst.

In some embodiments, the radio access node is configured to use sTTI/mini-slot scheduling for one or more subframes/slots at a defined periodicity. In some embodiments, the at least the first subframe/slot of the transmit burst are included in the one or more subframes for which the radio access node is configured to use sTTI/mini-slot scheduling at the defined periodicity.

In some embodiments, the at least the first subframes of the transmit burst is the first subframe of the transmit burst, and the radio access node is configured to use sTTI/mini-slot scheduling in the first subframe/slot of the transmit burst and configured to use full subframe/slot scheduling in all remaining subframes/slots of the transmit burst.

In some embodiments, the at least the first subframes of the transmit burst are the first X subframes of the transmit burst, where $X \geq 1$, and the radio access node is configured to use sTTI/mini-slot scheduling in the first X subframes/slots of the transmit burst and configured to use full subframe/slot scheduling in all remaining subframes/slots of the transmit burst. In some embodiments, $X > 1$.

In some embodiments, the at least the first subframes of the transmit burst are the first subframe of the transmit burst, and the radio access node is configured to use multi-sTTI/mini-slot scheduling in the first subframe/slot of the transmit burst and configured to use full subframe/slot scheduling in all remaining subframes/slots of the transmit burst.

In some embodiments, the at least the first subframes of the transmit burst are the first X subframes of the transmit burst, where $X \geq 1$, and the radio access node is configured to use multi-sTTI/mini-slot scheduling in the first X subframes/slots of the transmit burst and configured to use full subframe/slot scheduling in all remaining subframes/slots of the transmit burst. In some embodiments, $X > 1$.

In some embodiments, transmitting the transmit burst in the unlicensed spectrum using sTTI/mini-slot scheduling in the at least the first subframe/slot of the transmit burst comprises: preparing a transmission for the first subframe of the transmit burst as a full subframe transmission; determining that a LBT procedure for the transmit burst did not successfully complete before a start of the first subframe; and, upon determining that the LBT procedure for the transmit burst did not successfully complete before the start of the first subframe, reprocessing the transmission for the first subframe of the transmit burst as one or more sTTI/mini-slot transmissions in the first subframe. In some embodiments, transmitting the transmit burst further comprises transmitting the one or more sTTI/mini-slot transmissions in the first subframe. In some embodiments, the one or more sTTI/mini-slot transmissions in the first subframe comprise two or more sTTI/mini-slot transmissions in the first subframe, and transmitting the one or more sTTI/mini-slot transmissions in the first subframe comprises transmitting the two or more sTTI/mini-slot transmissions in the first subframe using multi-sTTI/mini-slot scheduling.

In some embodiments, the at least the first subframes of the transmit burst are the first subframe of the transmit burst, and the radio access node is configured to use sTTI/mini-slot scheduling in the first subframe/slot of the transmit burst and configured to use partial subframe/slot scheduling in all remaining subframes/slots of the transmit burst.

In some embodiments, transmitting the transmit burst comprises dynamically selecting either sTTI/mini-slot scheduling or partial subframe scheduling based on one or more criteria. In some embodiments, the one or more criteria comprise traffic type for the transmit burst.

Embodiments of a radio access node are also disclosed. In some embodiments, a radio access node for performing a transmit burst in an unlicensed spectrum is adapted to transmit a transmit burst in an unlicensed spectrum, wherein the transmit burst spans multiple subframes/slots and the transmitting of the transmit burst starts at one of a plurality of candidate starting points defined in at least a first subframe/slot of the transmit burst that occurs after successful completion of a LBT procedure for the transmit burst.

In some embodiments, a radio access node for performing a transmit burst in an unlicensed spectrum comprises a processor and memory comprising instructions executable by the processor whereby the radio access node is operable to transmit a transmit burst in an unlicensed spectrum, wherein the transmit burst spans multiple subframes/slots and the transmitting of the transmit burst starts at one of a plurality of candidate starting points defined in at least a first subframe/slot of the transmit burst that occurs after successful completion of a LBT procedure for the transmit burst.

BRIEF DESCRIPTION OF THE DRAWINGS

The accompanying drawing figures incorporated in and forming a part of this specification illustrate several aspects of the disclosure, and together with the description serve to explain the principles of the disclosure.

The drawings illustrate selected embodiments of the disclosed subject matter. In the drawings, like reference labels denote like features.

FIG. 8 illustrates an example of an embodiment of the present disclosure in which sTTI scheduling is used for a first subframe of a DL transmit burst and full subframe scheduling is used in the remaining subframes of the DL transmit burst;

FIG. 9 illustrates an example of an embodiment of the present disclosure in which multi-sTTI scheduling is used for a first subframe of a DL transmit burst and full subframe scheduling is used in the remaining subframes of the DL transmit burst;

DETAILED DESCRIPTION

Figure 1:
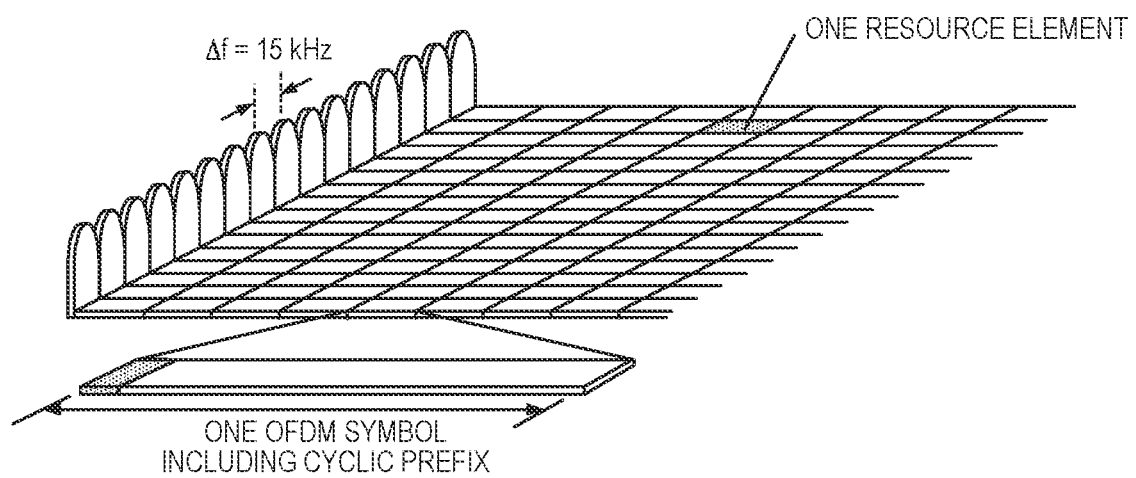
FIG. 1 illustrates the Long Term Evolution (LTE) downlink (DL) physical resource.
Figure 2:
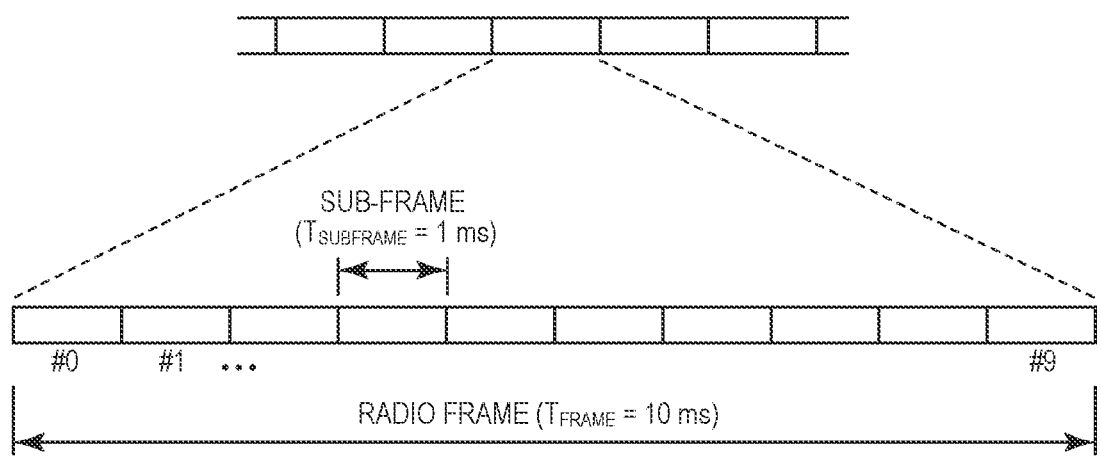
FIG. 2 illustrates the LTE time-domain structure.
Figure 3:
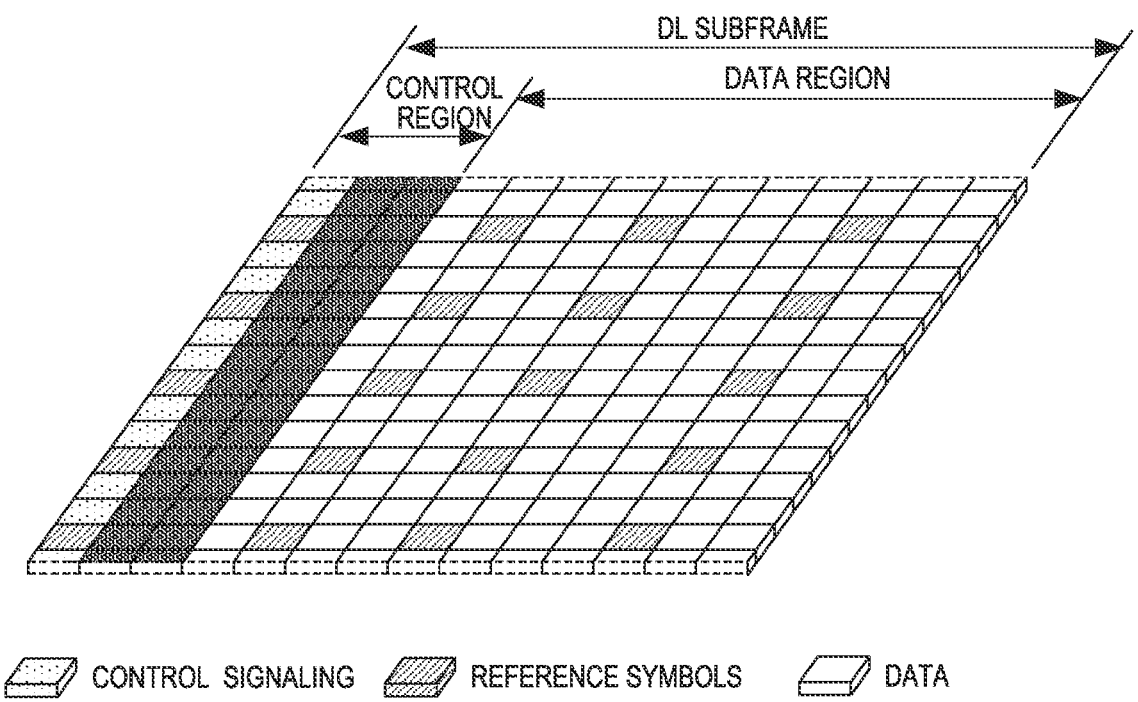
FIG. 3 illustrates a DL subframe.
Figure 4:
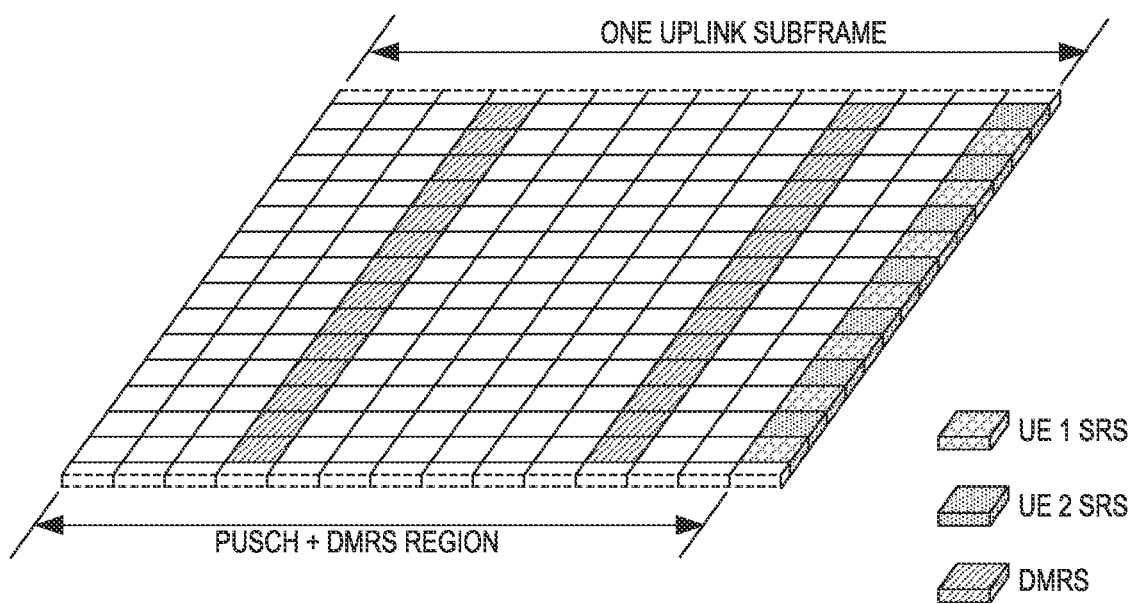
FIG. 4 illustrates an uplink (UL) subframe.
Figure 5:
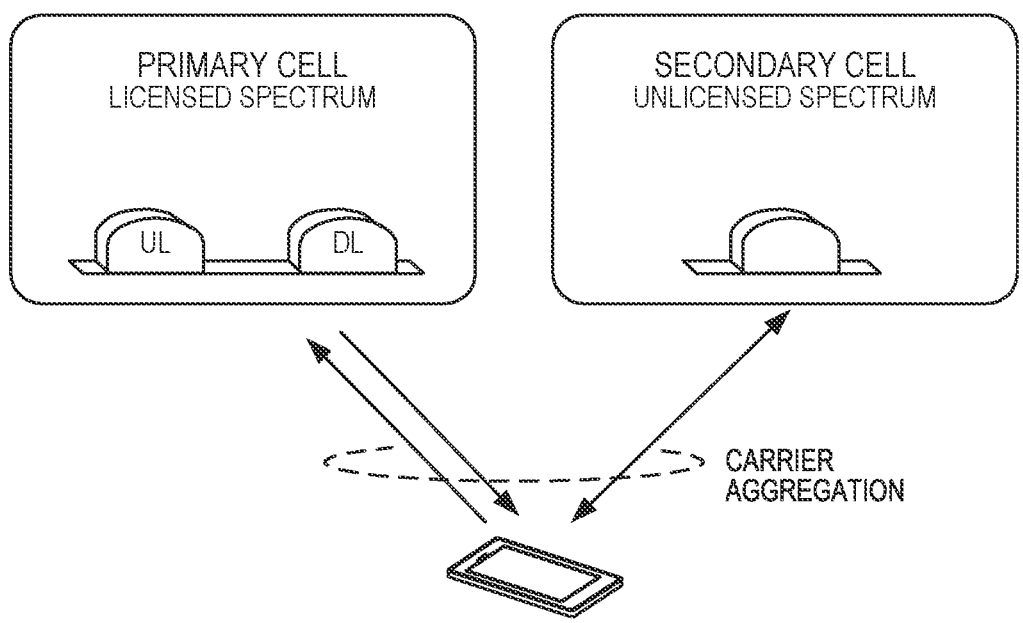
FIG. 5 illustrates License Assisted Access (LAA) to unlicensed spectrum using LTE Carrier Aggregation (CA)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the disclosed subject matter.

In certain embodiments of the disclosed subject matter, methods support multiple starting and ending positions for scheduled downlink (DL) transmission on unlicensed spectrum. Thus, a base station (e.g., an enhanced or evolved Node B (eNB) in Long Term Evolution (LTE)) has flexibility to transmit DL at different starting positions based on Listen-Before-Talk (LBT) outcome.

The disclosed methods can be applied to License Assisted Access (LAA)/New Radio in Unlicensed Spectrum (NR-U)/MulteFire or other technologies operating DL transmission on unlicensed spectrum.

In LAA, If LBT fails at the DL transmission starting point, the eNB will drop the transmission and treat it as a Negative Acknowledgement (NACK) and schedule a retransmission later on. This leads to delay of DL transmission and impacts the DL performance.

Certain embodiments of the disclosed embodiments may provide potential benefits compared to conventional techniques and technologies, such as the following examples.

Support of multiple starting positions for flexible and efficient channel access on unlicensed spectrum Reduce DL transmission delay and increase the overall system performance Enable efficient DL scheduling and transmission when multiple starting/ending positions is supported.

The disclosed subject matter provides methods that support multiple starting and ending positions for DL transmission on unlicensed spectrum. The description below assumes LAA operation as an example. However, the disclosed methods can also be applied to LAA/NR-U/MulteFire or other technologies operating DL transmission on unlicensed spectrum.

The described embodiments may be implemented in any appropriate type of communication system supporting any suitable communication standards and using any suitable components. As one example, certain embodiments may be implemented in a communication system such as that illustrated in FIG. 6. Although certain embodiments are described with respect to LTE systems and related terminology, the disclosed concepts are not limited to LTE or a Third Generation Partnership Project (3GPP) system. Additionally, although reference may be made to the term "cell," the described concepts may also apply in other contexts, such as beams used in Fifth Generation (5G) systems, for instance.

Figure 6:
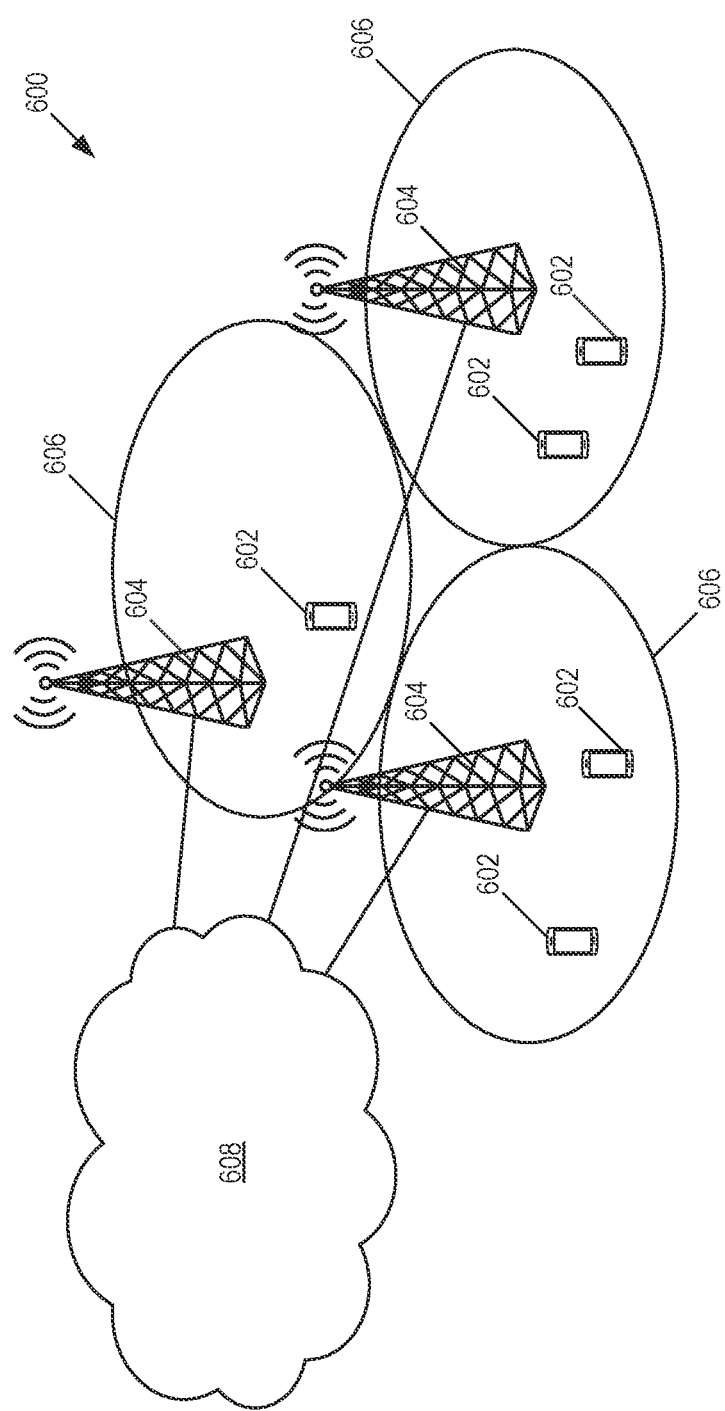
FIG. 6 illustrates a communication system according to an embodiment of the disclosed subject matter.

Referring to FIG. 6, a communication system 600 comprises a plurality of wireless communication devices 602 (e.g., User Equipment devices (UEs), Machine Type Communication (MTC)/Machine-To-Machine (M2M) UEs) and a plurality of radio access nodes 604 (e.g., eNBs or other base stations). The communication system 600 is organized into cells 606, which are connected to a core network 608 via corresponding radio access nodes 604. The radio access nodes 604 are capable of communicating with the wireless communication devices 602 along with any additional elements suitable to support communication between wireless communication devices or between a wireless communication device and another communication device (such as a landline telephone).

As described herein, at least some of the cells 606 operate in an unlicensed spectrum.

Before describing embodiments of the present disclosure, a discussion of short Transmit Time Interval (sTTI) for DL transmission on unlicensed spectrum is beneficial. According to embodiments of the present disclosure, sTTI enables multiple starting and ending points within one subframe. LAA can benefit from not only adding flexibility in terms of channel access, but also allowing short transmissions when the data to be transmitted is small (such as Transmission Control Protocol (TCP) Acknowledgements (ACKs)). Note that while the terms "subframe" and "sTTI" are used for LAA/LTE, in 5G, the terms "slot" and "mini-slot" are used. Thus, while the discussion below focuses on LAA and therefore uses the terms "subframe" and "sTTI," it is to be understood that the same concepts apply to 5G in Unlicensed Spectrum (5G-U) but where the term "slot" is used in place of "subframe" and the term "mini-slot" is used in place of "sTTI." Thus, the term "subframe/slot" is used to generally refer to either a subframe or a slot, and the term "sTTI/mini-slot" is used to generally refer to either a sTTI or a mini-slot.

Figure 7:
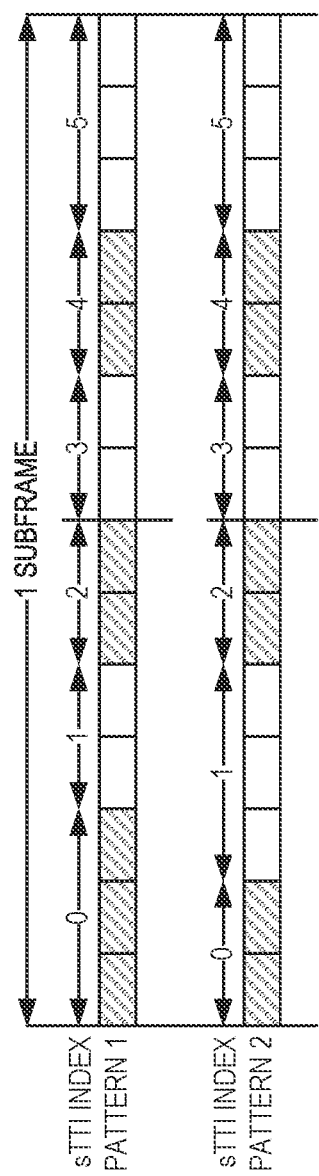
FIG. 7 illustrates two-symbol short Transmit Time Interval (sTTI) patterns.

Both 7-symbol and 2-symbol based sTTI can be considered for LAA DL. It has been agree that the pattern for 2-symbol based sTTI for short Physical Downlink Shared Channel (sPDSCH) and short Physical Downlink Control Channel (sPDCCH) is according to FIG. 7. Among the possible configurations, 2-symbol provides most flexibility in terms of channel access. However, since each of these short transmission requires new in-band control channel, smaller Transmit Time Intervals (TTIs) suffer from high overhead. Note that while the term sPDSCH is oftentimes used herein, sPDSCH is an LTE term. Other terminology may be used for NR.

In one embodiment, the eNB is configured to use sTTI for the whole DL transmit burst. In other words, a DL transmit burst includes multiple subframes, and a radio access node 604 (i.e., an eNB in LTE) is configured to use sTTIs (i.e., sTTI scheduling) for all of the subframes in the DL transmit burst. Thus, each sTTI within each subframe within the DL transmit burst is a candidate starting point for transmission. As such, if an LBT procedure for the DL transmit burst does not complete until after the start of the first subframe in the DL transmit burst, the radio access node 604 can select one of the sTTIs that occurs after the end of the LBT procedure as the starting point for transmission for the DL transmit burst.

In another embodiment, the eNB is configured to use sTTI configuration based on a certain frame periodicity. That is, the eNB is configured with one or more subframes that can be scheduled using sTTI every X subframes. Given that, the eNB benefits from additional starting points only within the subframes that are configured with sTTI transmissions. Thus, in this embodiment, a radio access node 604 is configured to use sTTIs every X subframes. Then, as an example, consider a scenario where the first subframe in a DL transmit burst is one of the subframes for which the radio access node 604 is configured to use sTTIs. In this embodiment, if the LBT procedure does not complete with a success until after the start of the first subframe, then the radio access node 604 selects a sTTI that occurs after completion of the LBT procedure as the starting point for transmission of the DL transmit burst.

In another embodiment, the eNB schedules using sTTI for the first subframe in the DL burst and uses full subframe transmissions for the subsequent subframes within the same DL burst as shown in FIG. 8. Thus, in this embodiment, a radio access node 604 (e.g., an eNB) is configured to use sTTI for the first subframe in the DL burst. If the LBT procedure completes with a success after the start of the first subframe, the radio access node 604 begins transmission for the DL burst starting with a sTTI in the first subframe that occurs after completion of the LBT procedure by using sTTI scheduling in the first subframe.

In another embodiment, the eNB schedules using sTTI for the first X (e.g., X=2) subframe in the DL burst and full subframe transmissions for the subsequent subframes within the same DL burst. Thus, in this embodiment, a radio access node 604 (e.g., an eNB) is configured to use sTTI for the first X subframes in the DL burst. If the LBT procedure completes with a success after the start of the first X subframes, the radio access node 604 begins transmission for the DL burst starting with a sTTI in the first X subframes that occurs after completion of the LBT procedure by using sTTI scheduling in the first X subframes.

As another embodiment, multi-TTI scheduling is used to schedule the remaining sTTI in the subframe after the LBT success and subsequent subframes use full subframe transmissions as shown in FIG. 9. In the example of FIG. 9, LBT completes with a success after the start of the first subframe, and the radio access node 604 (e.g., eNB) transmits using the remaining sTTIs in the first subframe using multi-sTTI scheduling, but then transmits in the subsequent subframes of the DL transmit burst using full subframe scheduling.

In a further embodiment, multi-TTI scheduling is used to schedule the remaining sTTI in the subframe after the LBT success and next X (e.g., X=1) subframes after LBTsuccess and then subsequent subframes use full subframe transmissions. There is a sPDCCH containing multi-TTI scheduling assignment for each subframe using sTTI. In other words, in this embodiment, a radio access node 604 (e.g., an eNB) is configured to use sTTI for the first X subframes in the DL burst. If the LBT procedure completes with a success after the start of the first X subframes, the radio access node 604 begins transmission for the DL burst starting with a sTTI in the first X subframes that occurs after completion of the LBT procedure by using multi-sTTI scheduling in the first X subframes. For the remaining subframes in the DL transmit burst, the radio access nodes transmits using full subframe scheduling.

Figure 10:
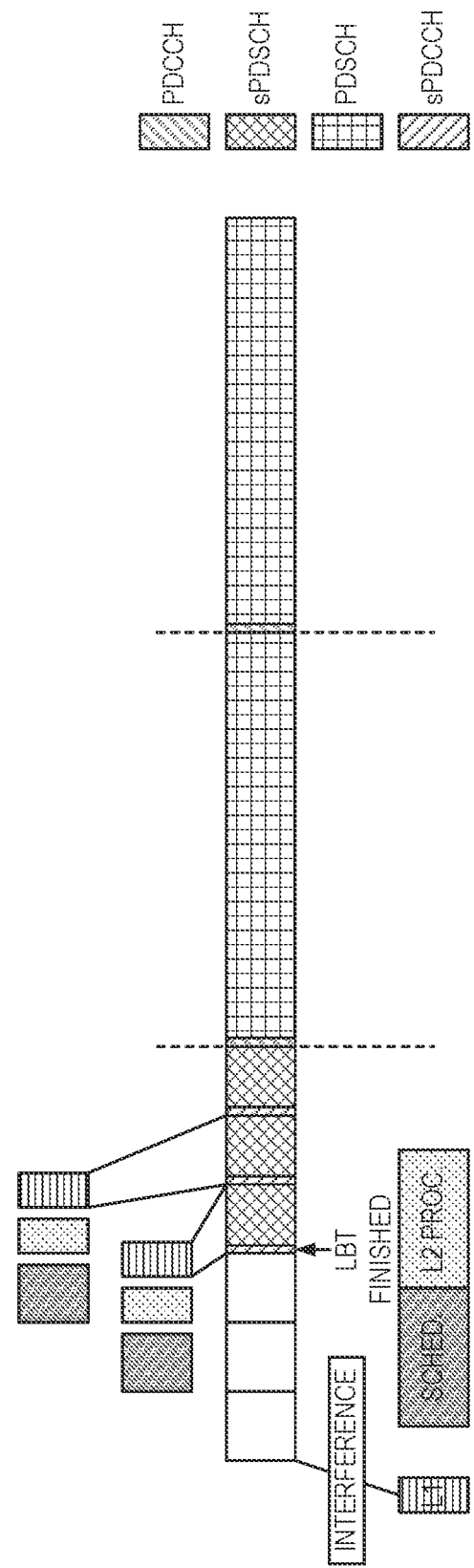
FIG. 10 illustrates an example of an embodiment of the present disclosure in which a full subframe transmission is prepared for the first subframe in a DL transmit burst and the transmission is reprocessed into an sTTI transmission(s) in the first subframe if a Listen-Before-Talk (LBT) procedure does not complete successfully until after the start of the first subframe.

As another embodiment, to avoid sTTI overhead, the eNB can prepare for a full subframe transmission. If the eNB succeeds to access the channel before the start of the subframe, the eNB transmit full subframes for the first and subsequent subframes in the DL burst. Otherwise, if the eNB fails to access the channel before the start of the subframe, the eNB may reprocess the prepared transmission and attempt to transmit at the start of the next possible sTTI. As a non-limiting example, reprocessing here may be by dropping the prepared Transport Block Size (TBS) and schedule a smaller TBS that can fit in a sTTI, or rate matching the same Transport Block (TB) to fit in a sTTI, or segmenting the same TB to smaller TBs that are mapped to multiple sTTIs. FIG. 10 shows an example where the eNB fails to finish the LBT before the subframe boundary, and continues to sense the channel. The eNB reschedules by selecting a smaller TBS that fits in the smaller sTTI. After successfully finishing the LBT before the fourth sTTI in the subframe, the eNB can start the transmission in the remaining sTTIs of the same subframe. According to this, the sTTI signaling overhead is limited only to the cases where the eNB cannot start the transmission at subframe boundary. In addition to that, multi-TTI scheduling can be applied in the remaining sTTIs so that sTTI control signaling is minimized.

In LTE Release (Rel) 13, a UE can be configured with two possible starting points {0,7} Orthogonal Frequency Division Multiplexing (OFDM) Symbol. L1 processing can adapt the same TBS into different amount of radio resources to accommodate two data transmission starting points based on the LBT outcome.

In a further embodiment, the eNB schedules the first subframe in a DL transmission burst using sTTI, and uses a Rel-13 specified partial subframe with two possible starting points for the subsequent subframes within the same DL burst.

In another embodiment, the eNB supports scheduling based on both sTTI and Rel-13 partial subframes, and dynamically select either sTTI scheduling or Rel-13 partial subframe scheduling according to, e.g., traffic type, etc.

Figure 11:
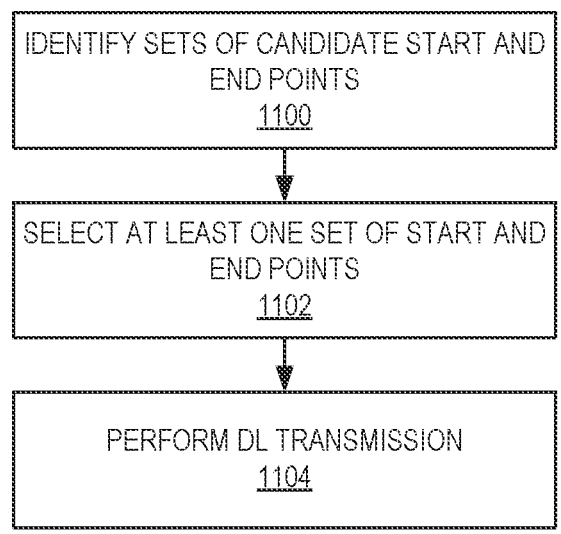
FIG. 11 illustrates a method according to an embodiment of the disclosed subject matter.

FIG. 11 illustrates a method of operating a radio access node 604 according to an embodiment of the disclosed subject matter. The method could be performed by an apparatus such as that illustrated in any of FIGS. 13A, 13B, and 14, for instance. Additionally, the method may be performed in conjunction with any of various alternative features as described above, such as various alternative time transmission interval configurations, subframe structures, timing arrangements, signaling procedures, etc.

Referring to FIG. 11, the method comprises identifying multiple sets of candidate start and end positions in a single subframe that are available for DL transmission in unlicensed spectrum (step 1100), selecting at least one set of start and end positions from among the candidates, based on at least one predetermined selection criterion (step 1102), and performing DL transmission in the unlicensed spectrum using the selected at least one set of start and end positions (step 1104).

Figure 12A:
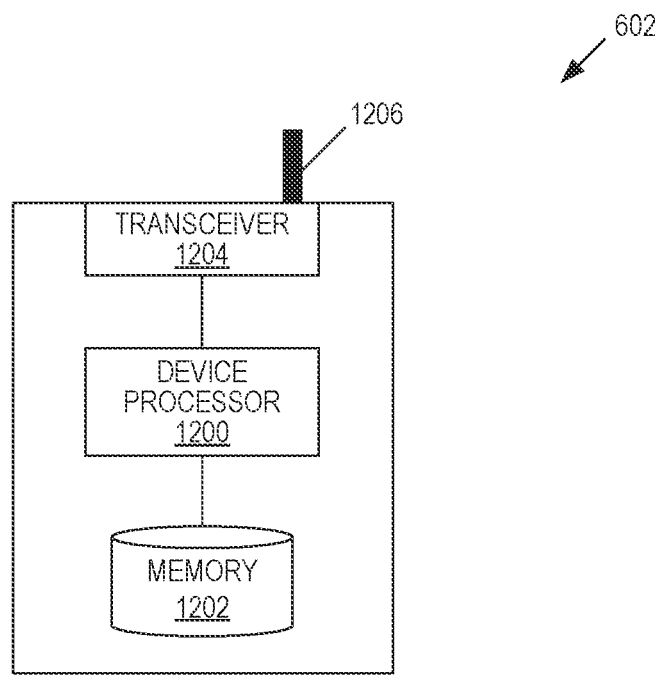
FIG. 12A illustrates a wireless communication device according to an embodiment of the disclosed subject matter.
Figure 12B:
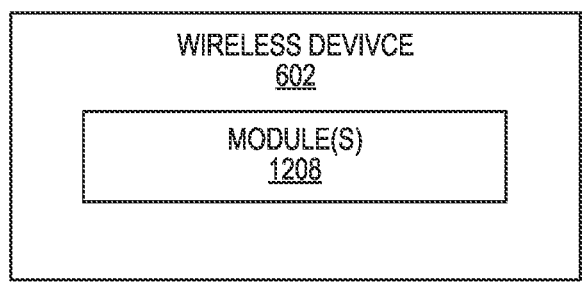
FIG. 12B illustrates a wireless communication device according to another embodiment of the disclosed subject matter.

Although wireless communication devices 602 may represent communication devices that include any suitable combination of hardware and/or software, these wireless communication devices may, in certain embodiments, represent devices such as those illustrated in greater detail by FIGS. 12A and 12B. Similarly, although the illustrated radio access node 604 may represent network nodes that include any suitable combination of hardware and/or software, these nodes may, in particular embodiments, represent devices such those illustrated in greater detail by FIGS. 13A, 13B, and 14.

Referring to FIG. 12A, a wireless communication device 602 comprises a processor 1200 (e.g., Central Processing Units (CPUs), Application Specific Integrated Circuits (ASICs), Field Programmable Gate Arrays (FPGAs), and/or the like), memory 1202, a transceiver 1204, and an antenna 1206. In certain embodiments, some or all of the functionality described as being provided by UEs, MTC, or M2M devices, and/or any other types of wireless communication devices may be provided by the device processor executing instructions stored on a computer-readable medium, such as the memory 1202. Alternative embodiments may include additional components beyond those shown in FIG. 12A that may be responsible for providing certain aspects of the device's functionality, including any of the functionality described herein.

Referring to FIG. 12B, a wireless communication device 602 comprises at least one module 1208 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 12A.

Figure 13A:
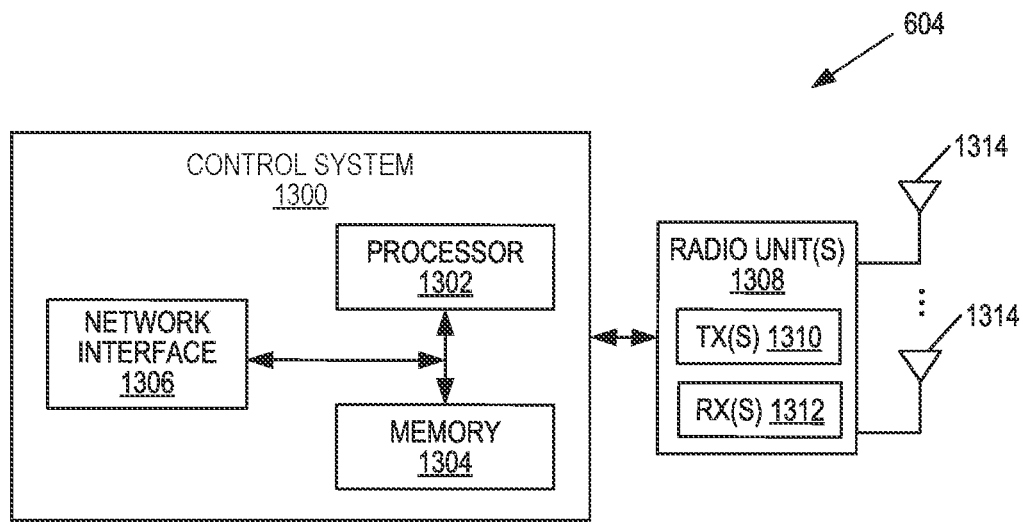
FIG. 13A illustrates a radio access node according to an embodiment of the disclosed subject matter.

Referring to FIG. 13A, a radio access node 604 comprises a control system 1300 that comprises a node processor 1302 (e.g., CPUs, ASICs, FPGAs, and/or the like), memory 1304, and a network interface 1306. In addition, the radio access node 604 comprises at least one radio unit 1308 comprising at least one transmitter 1310 and at least one receiver 1312 coupled to at least one antenna 1314. In some embodiments, the radio unit 1308 is external to the control system 1300 and connected to the control system 1300 via, e.g., a wired connection (e.g., an optical cable). However, in some other embodiments, the radio unit 1308 and potentially the antenna 1314 are integrated together with the control system 1300. The node processor 1302 operates to provide at least one function of the radio access node 604 as described herein. In some embodiments, the function(s) are implemented in software that is stored, e.g., in the memory 1304 and executed by the node processor 1302.

In certain embodiments, some or all of the functionality described as being provided by a base station, a node B, an eNB, and/or any other type of network node may be provided by the node processor 1302 executing instructions stored on a computer-readable medium, such as the memory 1304 shown in FIG. 13A. Alternative embodiments of the radio access node 604 may comprise additional components to provide additional functionality, such as the functionality described herein and/or related supporting functionality.

Figure 13B:
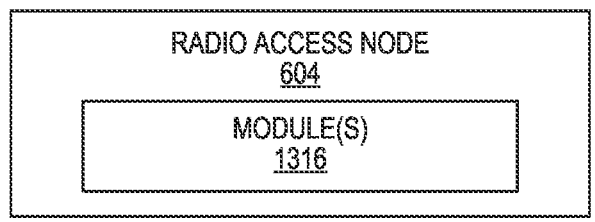
FIG. 13B illustrates a radio access node according to another embodiment of the disclosed subject matter.

Referring to FIG. 13B, a radio access node 604 comprises at least one module 1316 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 13A.

Figure 14:
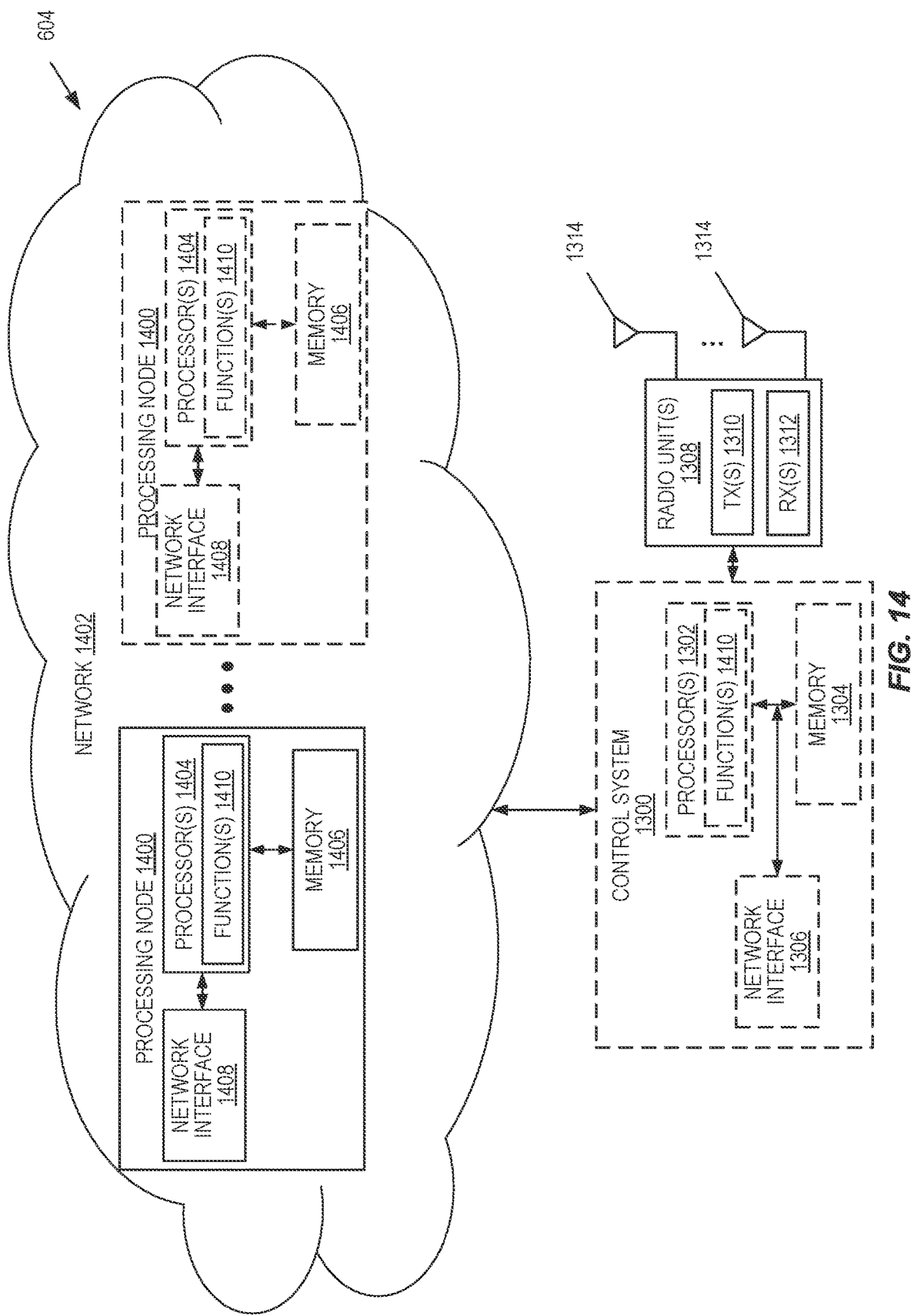
FIG. 14 illustrates a radio access node according to yet another embodiment of the disclosed subject matter.

FIG. 14 is a block diagram that illustrates a virtualized radio access node 604 according to an embodiment of the disclosed subject matter. The concepts described in relation to FIG. 14 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 14, the radio access node 604 optionally comprises the control system 1300 as described in relation to FIG. 13A.

The control system 1300 is connected to one or more processing nodes 1400 coupled to or included as part of a network(s) 1402 via the network interface 1306. Each processing node 1400 comprises one or more processors 1404 (e.g., CPUs, ASICs, FPGAs, and/or the like), memory 1406, and a network interface 1408.

In this example, functions 1410 of the radio access node 604 described herein are implemented at the one or more processing nodes 1400 or distributed across the control system 1300 and the one or more processing nodes 1400 in any desired manner. In some embodiments, some or all of the functions 1410 of the radio access node 604 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1300 is used in order to carry out at least some of the desired functions 1410. As indicated by dotted lines, in some embodiments the control system 1300 may be omitted, in which case the radio unit(s) 1308 communicate directly with the processing node(s) 1400 via an appropriate network interface(s).

In some embodiments, a computer program comprises instructions which, when executed by at least one processor, causes at least one processor to carry out the functionality of a radio access node (e.g., a radio access node 604) or another node (e.g., a processing node 1400) implementing one or more of the functions of the radio access node in a virtual environment according to any of the embodiments described herein.

At least some of the following abbreviations may be used in this disclosure. If there is an inconsistency between abbreviations, preference should be given to how it is used above. If listed multiple times below, the first listing should be preferred over any subsequent listing(s).

µs Microsecond
3GPP Third Generation Partnership Project
5G Fifth Generation
5G-U Fifth Generation in Unlicensed Spectrum
ACK Acknowledgement
ASIC Application Specific Integrated Circuit
BSR Buffer Status Report
CA Carrier Aggregation
CE Control Element
CFI Control Format Indictor
CPU Central Processing Unit
CRC Cyclic Redundancy Check
C-RNTI Cell Radio Network Temporary Identifier
CRS Cell Specific Reference Symbol
DCI Downlink Control Information
DFT Discrete Fourier Transform
DL Downlink
DMRS Demodulation Reference Signal
eNB Enhanced or Evolved Node B
EPDCCH Enhanced Physical Downlink Control Channel
FDMA Frequency Division Multiple Access
FPGA Field Programmable Gate Array
GHz Gigahertz
LAA License Assisted Access
LBT Listen-Before-Talk
LTE Long Term Evolution
M2M Machine-to-Machine
MAC Medium Access Control
ms Millisecond
MTC Machine Type Communication
NACK Negative Acknowledgement
NR-U New Radio in Unlicensed Spectrum
OFDM Orthogonal Frequency Division Multiplexing
PCell Primary Cell
PDCCH Physical Downlink Control Channel
PUCCH Physical Uplink Control Channel
PUSCH Physical Uplink Shared Channel
Rel Release
RRC Radio Resource Control
SCell Secondary Cell
SC-FDMA Single Carrier Frequency Division Multiple Access
sPDCCH Short Physical Downlink Control Channel
sPDSCH Short Physical Downlink Shared Channel
SR Scheduling Request
SRS Sounding Reference Signal
sTTI Short Transmit Time Interval
TB Transport Block
TBS Transport Block Size
TCP Transmission Control Protocol
TS Technical Specification
TTI Transmit Time Interval
UE User Equipment
UL Uplink
WLAN Wireless Local Area Network Those skilled in the art will recognize improvements and modifications to the embodiments of the present disclosure. All such improvements and modifications are considered within the scope of the concepts disclosed herein.

What is claimed is:

1. A method of operation of a radio access node for performing a transmit burst in an unlicensed spectrum, the method comprising:
    transmitting the transmit burst in the unlicensed spectrum, wherein:
        the transmit burst spans multiple subframes/slots;
        the transmitting of the transmit burst starts at one of a plurality of candidate starting points defined in at least a first subframe/slot of the transmit burst that occurs after successful completion of a Listen-Before-Talk, LBT, procedure for the transmit burst, the plurality of candidate starting points comprises starting points of two or more mini-slot transmissions in the at least the first subframe/slot of the transmit burst; the transmitting of the transmit burst comprises transmitting the two or more mini-slot transmissions in the at least the first subframe/slot of the transmit burst in the unlicensed spectrum using mini-slot scheduling in the at least the first subframe/slot of the transmit burst; and
        the radio access node is configured to use the mini-slot scheduling for one or more subframes/slots at a defined periodicity.

2. The method of claim 1 wherein:
    the LBT procedure for the transmit burst successfully completes after a start of the first subframe/slot of the transmit burst such that the one of the plurality of candidate starting points at which the transmitting of the transmit burst begins occurs after the start of the first subframe/slot of the transmit burst.

3. The method of claim 1 wherein:
    the LBT procedure for the transmit burst completes after a start of the first subframe/slot of the transmit burst; and
    the one of the plurality of candidate starting points at which the transmitting of the transmit burst begins is the starting point of one of the two or more mini-slot transmissions in the at least the first subframe/slot of the transmit burst that occurs after successful completion of the LBT procedure for the transmit burst.

4. The method of claim 1 wherein the radio access node is configured to use the mini-slot scheduling in all subframes/slots of the transmit burst.

5. The method of claim 1 wherein the at least the first subframe/slot of the transmit burst are included in the one or more subframes/slots for which the radio access node is configured to use the mini-slot scheduling at the defined periodicity.

6. The method of claim 1 wherein:
    the at least the first subframe/slot of the transmit burst is the first subframe/slot of the transmit burst; and
    the radio access node is configured to use the mini-slot scheduling in the first subframe/slot of the transmit burst and configured to use full subframe/slot scheduling in all remaining subframes/slots of the transmit burst.

7. The method of claim 1 wherein:
the at least the first subframe/slot of the transmit burst is a first X subframes/slots of the transmit burst, where X≥1; and
the radio access node is configured to use the mini-slot scheduling in the first X subframes/slots of the transmit burst and configured to use full subframe/slot scheduling in all remaining subframes/slots of the transmit burst.

8. The method of claim 7 wherein X>1.

9. The method of claim 1 wherein:
the at least the first subframe/slot of the transmit burst is the first subframe/slot of the transmit burst; and
the radio access node is configured to use multi-mini-slot scheduling in the first subframe/slot of the transmit burst and configured to use full subframe/slot scheduling in all remaining subframes/slots of the transmit burst.

10. The method of claim 1 wherein:
the at least the first subframe/slot of the transmit burst is a first X subframes/slots of the transmit burst, where X≥1; and
the radio access node is configured to use multi-mini-slot scheduling in the first X subframes/slots of the transmit burst and configured to use full subframe/slot scheduling in all remaining subframes/slots of the transmit burst.

11. The method of claim 10 wherein X>1.

12. The method of claim 1 wherein the transmitting of the transmit burst in the unlicensed spectrum using the mini-slot scheduling in the at least the first subframe/slot of the transmit burst comprises:
preparing a transmission for the first subframe/slot of the transmit burst as a full subframe/slot transmission;
determining that the LBT procedure for the transmit burst did not successfully complete before a start of the first subframe/slot; and
upon determining that the LBT procedure for the transmit burst did not successfully complete before the start of the first subframe/slot, reprocessing the transmission for the first subframe/slot of the transmit burst as one or more mini-slot transmissions in the first subframe/slot.

13. The method of claim 12 wherein the transmitting of the transmit burst further comprises transmitting the one or more mini-slot transmissions in the first subframe/slot.

14. The method of claim 13 wherein:
the one or more mini-slot transmissions in the first subframe/slot comprise the two or more mini-slot transmissions in the first subframe/slot; and
transmitting the one or more mini-slot transmissions in the first subframe/slot comprises transmitting the two or more mini-slot transmissions in the first subframe/slot using multi-mini-slot scheduling.

15. The method of claim 1 wherein:
the at least the first subframe/slot of the transmit burst is the first subframe/slot of the transmit burst; and
the radio access node is configured to use the mini-slot scheduling in the first subframe/slot of the transmit burst and configured to use partial subframe/slot scheduling in all remaining subframes/slots of the transmit burst.

16. The method of claim 1 wherein the transmitting of the transmit burst comprises:
dynamically selecting either the mini-slot scheduling or partial subframe scheduling based on one or more criteria.

17. The method of claim 16 wherein the one or more criteria comprise traffic type for the transmit burst.

18. A radio access node for performing a transmit burst in an unlicensed spectrum, comprising:
a processor; and
memory comprising instructions executable by the processor whereby the radio access node is operable to transmit a transmit burst in an unlicensed spectrum, wherein:
the transmit burst spans multiple subframes/slots; and
the transmitting of the transmit burst starts at one of a plurality of candidate starting points defined in at least a first subframe/slot of the transmit burst that occurs after successful completion of a Listen-Before-Talk, LBT, procedure for the transmit burst, the plurality of candidate starting points comprises starting points of two or more mini-slot transmissions in the at least the first subframe/slot of the transmit burst;
the transmitting of the transmit burst comprises transmitting the two or more mini-slot transmissions in the at least the first subframe/slot of the transmit burst in the unlicensed spectrum using mini-slot scheduling in the at least the first subframe/slot of the transmit burst; and
the radio access node is configured to use the mini-slot scheduling for one or more subframes/slots at a defined periodicity.

* * * * *